H. W. SHERMAN.
DIFFERENTIAL MECHANISM.
APPLICATION FILED AUG. 16, 1915.
1,179,667.
Patented Apr. 18, 1916.
2 SHEETS—SHEET 2.
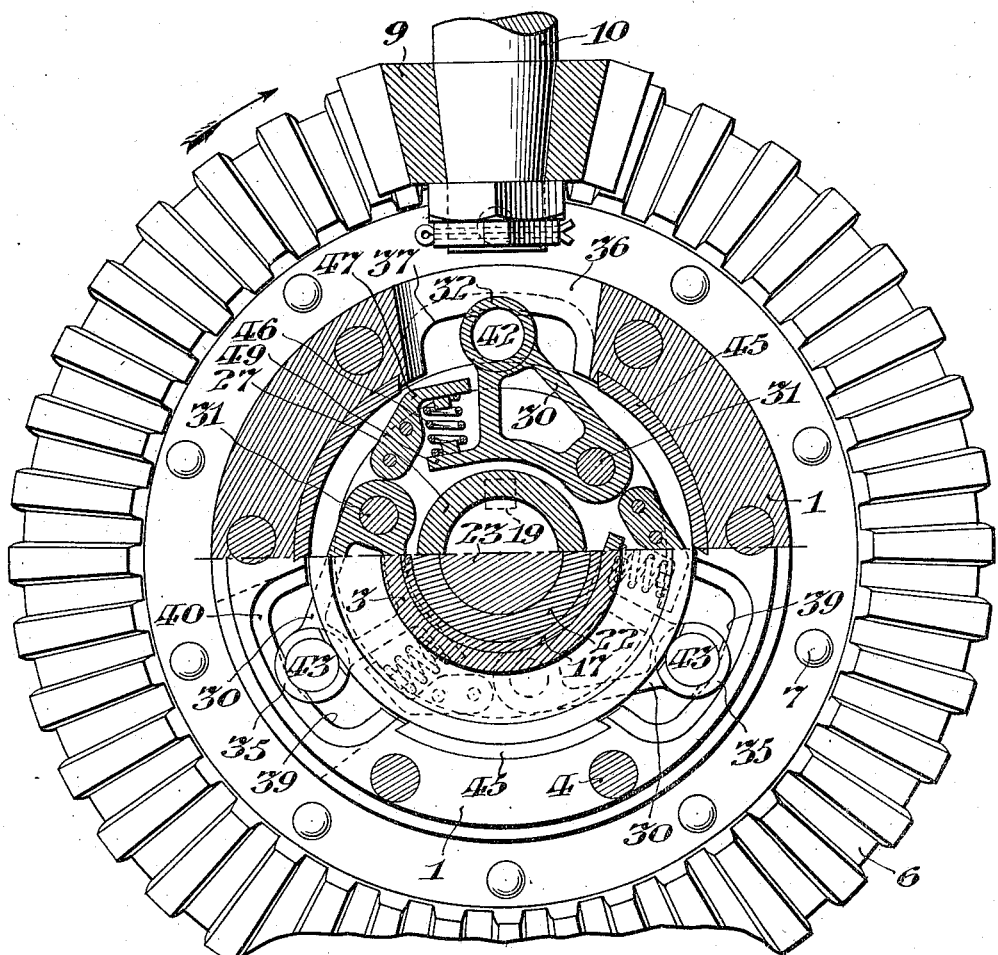

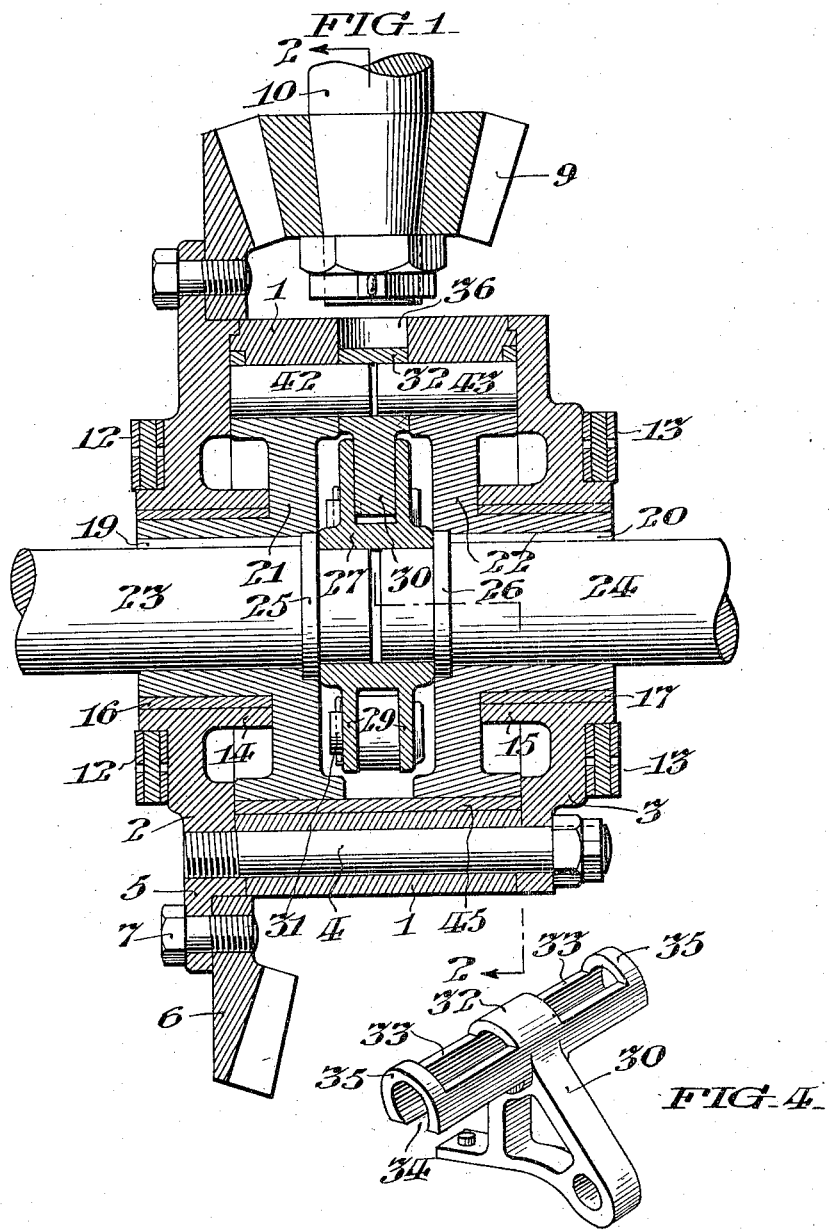

UNITED STATES PATENT OFFICE.

HENRY W. SHERMAN, OF READING, PENNSYLVANIA, ASSIGNOR OF ONE-HALF TO ELMER L. SCHRECK, OF READING, PENNSYLVANIA.

DIFFERENTIAL MECHANISM.

1,179,667. Specification of Letters Patent. Patented Apr. 18, 1916.

Application filed August 16, 1915. Serial No. 45,615.

*To all whom it may concern:*

Be it known that I, HENRY W. SHERMAN, a citizen of the United States, residing at Reading, in the county of Berks and State of Pennsylvania, have invented certain new and useful Improvements in Differential Mechanism, of which the following is a specification.

My invention relates particularly to differential driving mechanism necessarily employed in motor driven vehicles for the purpose of permitting compensation or relative movement of the driving wheels, especially when traversing a curved path.

The principal objects of my invention are to provide differential mechanism so constructed and arranged that the shaft sections which are connected with the respective driving wheels will be so rigidly connected together temporarily as to be, under normal conditions, propelled with equal force, whereby traction is obtained and skidding prevented.

Other objects of my invention are to provide differential mechanism in which the respective shaft sections will be automatically released or propelled selectively when the traction of the driving wheels of the respective shaft sections relatively varies, or when they traverse a curved path.

My invention further comprehends differential mechanism in which the driving element will remain connected with the wheel having the greatest traction and consequently drive the wheel traversing the curve of least radius, while automatically releasing the wheel traversing the curve of greatest radius.

My invention also includes all of the various novel features of construction and arrangement of the coöperative parts as hereinafter more definitely specified.

In the accompanying drawings Figure 1 is a transverse horizontal sectional view of a differential construction conveniently embodying my invention, the casing being omitted for convenience of illustration, Fig. 2 is a vertical longitudinal sectional view of the structure shown in Fig. 1 taken in different planes as indicated by the line 2—2 in said figure; Fig. 3 is a side elevational view of the roller ratchet ring; and Fig. 4 is a perspective view of one of the levers in which the ratchet rollers are mounted.

In said figures the differential housing comprises the cylindrical ratchet ring 1, to the opposite sides of which the bearing plates 2 and 3 are secured by bolts 4. The bearing plate 2 is provided with the flange 5 to which the beveled gear ring 6 is attached by tap bolts 7, said gear ring 6 being arranged to be driven by the bevel pinion 9 on the engine or motor shaft 10, as shown in Figs. 1 and 2. The rotation of the gear ring 6 effects the rotation of the housing thus described within any suitable form of casing (not shown) and for which purpose the plates 2 and 3 are conveniently provided with bearing rings 12 and 13.

The bearing plates 2 and 3 are respectively provided with bearings 14 and 15 having the bearing bushings 16 and 17 for rotatably supporting the hubs of the left and right shaft rollers 21 and 22 which are respectively connected by keys 19 and 20 with the left and right axle shaft sections 23 and 24 having the flanges 25 and 26 respectively disposed at a short distance from the substantially abutted ends of said shaft sections as best shown in Fig. 1.

The opposed ends of the shaft sections 23 24 provide suitable trunnions for rotatably carrying the pawl supporting frame 27 which has a central circumferential groove forming spaced flanges 29 between which a plurality of levers 30 are pivotally mounted on suitable pins or pintles 31.

The levers 30 are generally triangular in form, as best shown in Figs. 2 and 4 and each have a substantially cylindrical hollow head 32 extended laterally and having diametrically opposite openings 33 and 34 the latter extending through the ends thereof and the former terminating short of said ends and forming the loops 35.

As best shown in Fig. 2, three of such levers may be conveniently employed having the heads 32 projecting radially into suitably formed recesses 36 extending through the cylindrical wall of the ratchet ring 1 and having their lateral extensions projecting through suitable apertures 37 extending from the recesses 36 laterally through the side edges of said ratchet ring 1 and having their outer surfaces 39 extended in relatively angular planes and respectively terminating in central peaks. Extending around each of the apertures 37 is a marginal recess 40 which provides space for the loop 35 of the head of the lever 30 and permits the free circumferential movement of said head therein. Within the hollow of each head 32 two wedge rollers 42 and 43 are mounted in axial alinement, with the circumferential surfaces extending through the openings 33 and 34, the roller 42 being disposed to roll upon the circumference of the shaft roller 21, and the roller 43 being disposed to roll upon the shaft roller 22, as best shown in Fig. 1.

As shown in Fig. 2 the rollers 42 and 43 are disposed in what may be termed the normal position with respect to the openings 37, that is to say in the central or deepest part beneath the peak, so that any tendency of said rollers to rotate from such central position, in either direction, will cause them to be wedged between the circumferential surface of the shaft roller and surface 39 of the aperture 37 and thereby lock the ratchet ring 1 with the shaft roller between whose surface and said ring the wedge roller may be wedged. The inner surface of the wedge ring 1 between the apertures 37 may be preferably provided with sectoral bearing bushings 45 upon which the shaft rollers may rotate when the vehicle is traversing a curved path. The wedge rollers are normally forced into engagement with the shaft rollers 21 and 22 by springs 46 which are held between the abutments 47 and the projections 49 on the levers 30 as best shown in Fig. 2.

From the foregoing description it will be seen that when the gear ring 6 is driven by the pinion 9 in the direction of the arrow thereon in Fig. 2 the wedge rollers 42 and 43 will be wedged in the left side of the aperture 37, (Fig. 2) and cause the shaft rollers 21 and 22, and consequently the shafts 23 and 24 to rotate with the gearing 6 and the differential housing. Should the vehicle be turned to the right, the wedge roller 43 will remain wedged in the position above described while the tendency of the axle shaft 23 to rotate faster than the axle shaft 24 will cause a release of the wedge roller 42 and permit the free rotation of the shaft roller 21 until the vehicle is again directed in a straight course when the wedge roller 42 will again become wedged and cause the shaft sections 23 and 24 to rotate synchronously in the same direction.

It will noted that when traveling in a straight course, the shifting of the gears from low to high when the car has reached its maximum low speed, the clutch being thrown out the speed of the axle shaft sections 23 and 24 becomes greater than the speed of the propelling shaft and therefore the shaft sections will in effect drive the differential which will cause the wedge rollers to shift from the left side of the apertures 37 to the right side, but will again be shifted back upon throwing in the clutch on high gear as will be readily seen.

I do not desire to limit my invention to the precise details of construction and arrangement herein set forth as it is obvious that various modifications may be made therein without departing from the essential features of my invention as defined in the appended claims.

Having thus described my invention I claim:

1. In differential mechanism, the combination with independent shaft sections, of rollers on said shaft sections, a housing arranged to be driven and comprising a ratchet ring having a plurality of recesses each having relatively inclined surfaces a plurality of pivotally supported levers having open pockets extending into said recesses, and separate wedge rollers serving as pawls in said recesses and arranged to be wedged between said inclined surfaces and the circumferential surfaces of the shaft rollers by relative movement of said housing and shaft sections to lock them together.

2. In differential mechanism, the combination with independent shaft sections, of rollers on said shaft sections, a driven ratchet ring having a plurality of recesses each having relatively inclined surfaces, a frame journaled on said shaft sections, levers carried by said frame and having open cylindrical heads, and separate wedge rollers rotatably supported in said heads between said inclined surfaces and the circumferential surfaces of the shaft rollers, and arranged to be wedged there between to lock said driven ring with said shaft rollers.

3. In differential mechanism, the combination with independent shaft sections, of rollers on said shaft sections, a driven ratchet ring having a plurality of recesses each having relatively inclined surfaces, a frame immovable with respect to said ring, a plurality of levers pivotally carried by said frame and having transverse open pockets extending into said recesses and arranged to move circumferentially therein, independent ratchet rollers rotatably carried in said pockets and respectively disposed between the circumferential surface of the rollers of the respective shaft sections and said inclined surfaces and arranged to be automatically wedged between said surfaces by relative rotation of said surfaces to lock said shaft rollers and ring together.

4. In differential mechanism, the combination with independent shaft sections, of rollers carried by the respective shaft sections, a driven ring surrounding said rollers having a plurality of internal recesses whose circumferential surfaces are each formed in relatively oblique planes intersecting at the center of said recesses, a plurality of pivotally supported levers having open pockets extending into said recesses and circumferentially movable therein, a pair of wedge rollers carried in each of said pockets and maintained in alinement thereby and respectively disposed between the circumferential surfaces of the shaft rollers and the inclined surfaces of said recesses and arranged to be wedged there between upon any tendency of relative movement of said ring and shaft rollers, to lock them together, and means tending to press said wedge rollers into engagement with said shaft rollers.

In testimony whereof I affix my signature.

HENRY W. SHERMAN.

Copies of this patent may be obtained for five cents each, by addressing the "Commissioner of Patents, Washington, D. C."